Aug. 2, 1938.                T. W. MULLEN                2,125,578
                             CASING REPAIR
                         Filed Oct. 24, 1936            2 Sheets-Sheet 2
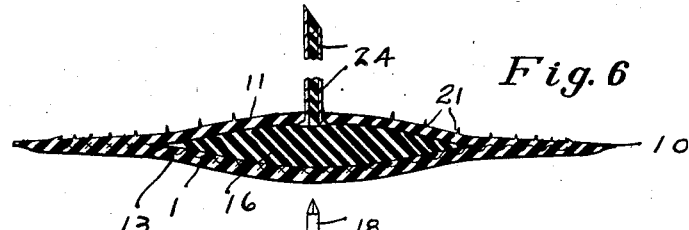
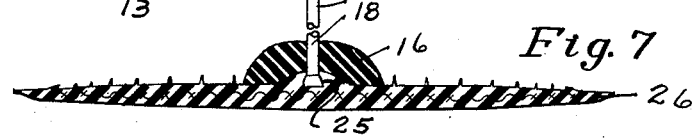
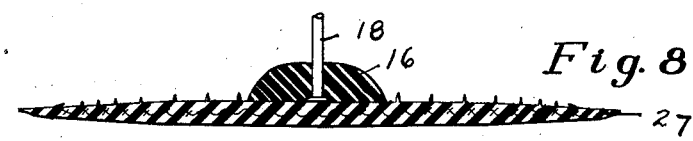
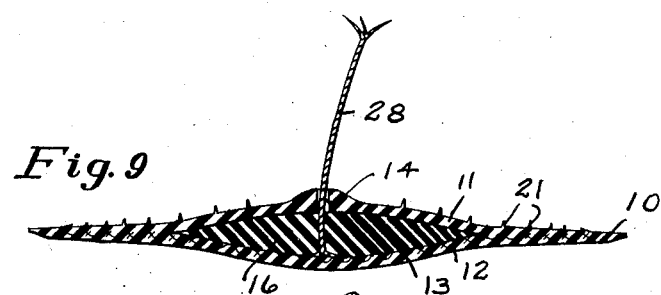
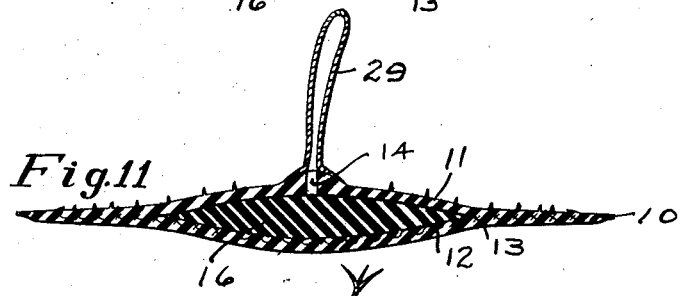
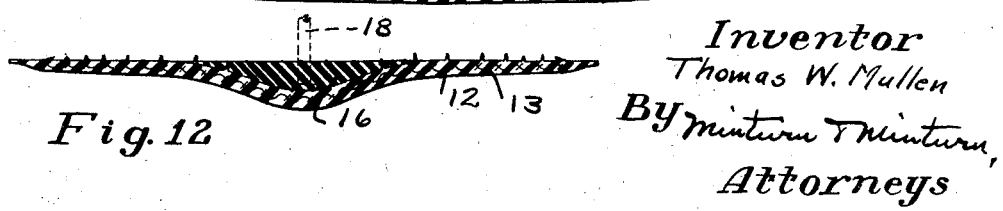

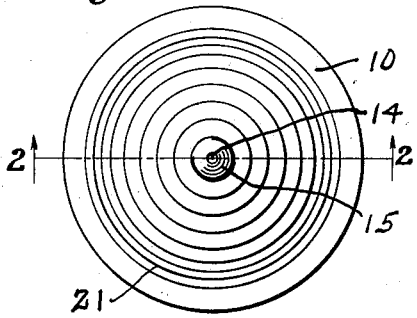
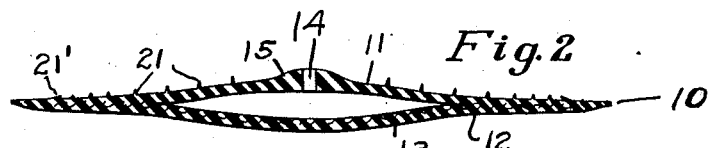
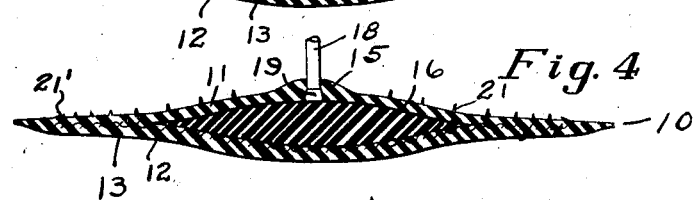
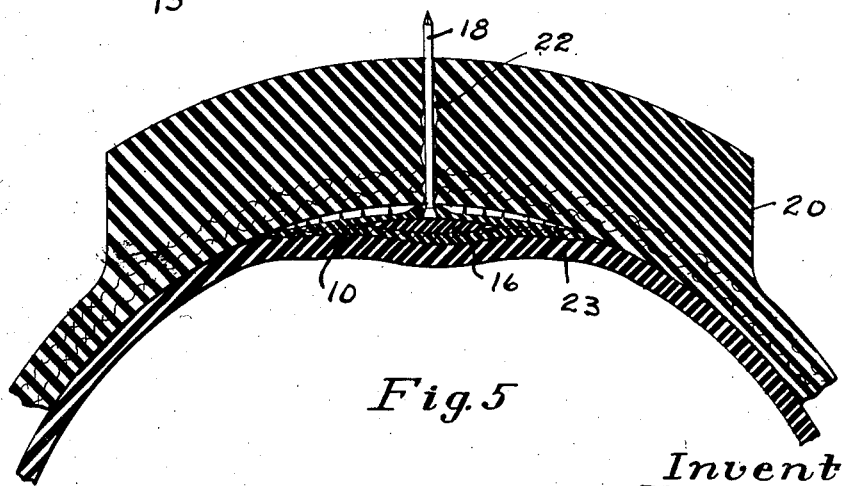

Patented Aug. 2, 1938

2,125,578

UNITED STATES PATENT OFFICE 2,125,578

CASING REPAIR

Thomas W. Mullen, Indianapolis, Ind., assignor to Bowes Seal-Fast Corporation, Indianapolis, Ind.

Application October 24, 1936, Serial No. 107,384

11 Claims. (Cl. 152—370)

This invention relates to means for repairing tire casings and has among its primary objects the provision of means for maintaining the repair element in central alignment over the hole being repaired in the casing; means for introducing a hole filling and sealing material from the repair element; means for preventing slippage of the repair element along the casing after being in use; and particularly the formation of a plug of sealing material which in effect, being flowable initially, becomes an integral part of the repair element.

Also incorporated in the invention is the provision of a removable pilot to be used in conjunction with a patch or repair element whereby the pilot will center the patch about the hole being repaired and after installation of the tube within the casing and the mounting of the casing on the usual wheel, the pilot may be withdrawn to permit flow of the sealing gum or material in the hole, the pilot serving further to suck the gum into the hole as the pilot exerts a cleaning and pumping action upon being withdrawn from the external side of the casing.

A still further important object of the invention is to provide a casing repair element or patch which is provided with a pocket or cavity to carry a casing hole sealing material in a liquid or plastic state so that as the patch may be compressed against the inner side of the casing, the sealing material carried by the patch may be extruded into the hole of the casing.

These and many other objects and advantages will become apparent to those versed in the art in the following description of the invention which is shown more or less diagrammatically in the accompanying drawings, in which Fig. 1 is a top plan view of a patch embodying the invention;

Fig. 2, a diametrical section on the line 2—2 in Fig. 1;

Fig. 3, a similar section showing the patch as having been filled with a sealing material;

Fig. 4, a similar section showing a removable pilot in position;

Fig. 5, a transverse section through the tread of the casing showing the invention applied thereto;

Fig. 6, a section similar to that shown in Fig. 4, but with a modified form of pilot;

Fig. 7, a modified form of the patch in diametrical section;

Fig. 8, a still further modified form in diametrical section;

Fig. 9, a diametrical section of a patch using a modified form of pilot;

Fig. 10, a further modified form in like section;

Fig. 11, a still further modified form of the flexible pilot structure in like section; and Fig. 12, a form in diametrical section modified from that shown in Fig. 2.

Like characters of reference indicate like parts throughout the several views in the drawings.

In the preferred form of the invention, a patch element, generally designated by the numeral 10, is formed to have any desired shape, here shown as circular. The patch is formed to have a plurality of layers of material, here shown in a simple form as having an upper layer of rubber 11, an intermediate layer of fabric 12 and an under layer of rubber 13. All of these layers are secured one to another around their entire peripheral portions and the fabric 12 is vulcanized or otherwise suitably secured to the lower layer 13 over the entire contacting areas. The central portion of the upper layer of rubber 11 is, however, left un-detached and free of union with the under layer of fabric 12 and rubber 13. By reason of this construction, a pocket or interior cavity is left within the patch. An orifice 14 is provided centrally through the upper layer of rubber 11 as a means of free communication with this internal cavity. The rubber immediately about the orifice 14 may be raised to form a more or less button-like protuberance 15 as a means of stiffening the rubber immediately about the orifice. This thickening is particularly desirable where the upper layer of rubber 11 may be thin. The cavity formed within the patch may be filled with any suitable sealing material 16 such as a rubber cement or gum commonly employed to seal holes through rubber casings. This gum may be carried into the cavity by inserting a tubular member 17 through the orifice 14 and causing the material 16 to be flowed therethrough until the cavity is filled with the desired amount of material 16 whereupon the patch will assume some such shape as suggested in Fig. 3.

After placing the material 16 within the patch, in the preferred form, a pilot 18 having a head 19 thereon, is pressed down through the orifice 14 to have the head 19 carried through the rubber 11 and bear thereagainst from its under side as a means of normally retaining the pilot 18 in a position to project upwardly from the patch as indicated in Fig. 5.

The upper side of the patch 10 is given a coating of some suitable material which will cement or vulcanize the rubber 11 to the inside of the casing 20. In order to prevent after-slippage of the patch 10 along the inside of the casing 20, the upper surface of the rubber 11 is preferably provided with a plurality of knife-like projections 21 of such contour and elevation as will cause these projections to bite into and embed themselves in the inner side of the casing 20. In the form herein shown, these projections 21 are concentric and are spaced apart a sufficient distance as will permit the surface of the rubber 11 to come into contact with the surface of the casing 20 after these projections have been embedded therein. Also it is to be noted that these projections are of a gradually decreased elevation from the center to the outer portion of the patch and that the outer projection 21' is under-cut from the inner side.

The patch is entered within the casing 20 and the pilot 18 is carried outwardly through a hole 22 which is being repaired. The pilot 18 is allowed to project from the casing 20 with the patch firmly seated against the inside of the casing wall and then the inner tube 23 is placed within the casing, the entire assembly mounted in the usual manner and the inner tube inflated. When the tube 23 has been sufficiently inflated as to retain the patch 10 in position, the pilot 18 is pulled outwardly and as it travels, by reason of the enlarged head, the sealing material 16 will tend to be sucked out behind the head 19 and into the hole 22. Also by reason of the enlarged head 19 travelling through the hole 22, the hole will be opened up immediately ahead of the material 16 flowing in therebehind so that the material 16 may reach intimately all of the ragged interior wall portions of the hole. Furthermore the enlarged head 19 tends to cleanse the hole 22 of foreign matter as it travels out from the casing. The material 16 will thus be forced in a very thorough manner into the hole 22 entirely throughout its length particularly by reason of the follow-up pressure exerted from the tube 23 tending to flatten out the patch 10. The material 16 being of a vulcanizing or semivulcanizing nature, will completely fill in and close the hole 22 against the entrance of moisture and become to all intents and purposes, an integral part of the casing, particularly bonding the ragged edges of the fabric layers within the casing which have been broken around the hole.

While it is entirely possible to have the upper surface of the patch pre-coated with a vulcanizing material and also to have the patch 10 filled with the material 16 with a protecting cloth or cover thereover, it is preferred that the patch be filled at the time it is to be employed and that the cement likewise be freshly applied so that these materials may be absolutely fresh and ready to perform their sealing and vulcanizing actions.

In reference to the form shown in Fig. 6, the pilot is shown as being a tubular member 24 detachably carried by a flanged end by the patch 10. In this event, the member 24 would serve as the filling member for the material 16. However where a pressure gun is available, the material 16 may be very effectively injected in the patch through the tubular nozzle or member 17, Fig. 3, which would then be a part of the gun (not shown). Also it is to be noted that in Fig. 6 there is no thickening of the upper rubber 11 about the pilot 24, this construction being equally as well adapted to the forms as shown in Figs. 1-5 where desirable.

Further modification of the invention is suggested in Fig. 7 wherein the pilot 18 is detachably held within an under-cut recess 25 of the patch 26. The patch in this case is not provided with a central cavity, but has the sealing gum or dough 16 carried on top of the patch. In this event the pilot 18 would center the patch 26 as above indicated and upon being withdrawn from the patch 26, the dough 16 could immediately follow in behind the head of the pilot into the hole being repaired. This modification can be carried still further to the form shown in Fig. 8 wherein the pilot 18 is detachably mounted on the patch 27 by having the head embedded in the dough 16 adhering to the upper side of the patch 27 without having the head carried into the patch itself.

In the repair of some types of holes, particularly where there may be a hole of large diameter, it may be advisable to employ a cord or other like material element to help fill and re-enforce the hole and the material applied therein. In this event the modified forms as shown in Figs. 9-11 may be employed.

Referring first to Fig. 9, the patch 10 is formed to have a cord 28 attached by one end to the lower part of the patch to extend outwardly freely through the opening 14. The cavity of the patch may be filled as above explained with the gum or dough which eventually works into the casing hole and the cord 28 is carried outwardly through the hole 22 of the casing in any suitable manner such as by a needle and by pulling on the cord, the patch 10 may be brought up, centered and firmly seated against the inside wall of the casing in reference to the hole 22. Several advantages arise from this particular form in that the cord itself may serve as a reenforcing and filling-in element in the hole 22. Furthermore it may serve in the manner of a wick to aid in feeding the gum upwardly and outwardly through the hole 22. In any event the cord serves as a pilot to center the patch and to retain the patch in the centered position in reference to the hole 22 while the casing is being mounted for use.

In the form shown in Fig. 10, the patch is of the form as shown in Fig. 8 and the cord 28 has its lower end attached to the patch and the gum or dough 16 is applied immediately around the cord on top of the patch.

In the form shown in Fig. 11, the patch is of that form as shown in Figs. 1-5 having the central cavity therein with the opening 14. In this form, however, a flexible cord 29 is employed and has both of its ends secured to the upper portion 11 of the patch 10, one end on each side of the central hole 14 so as not to interfere with the free flow through that orifice. The cord is thus looped and this looped end is pulled through the hole 22 in the casing as a means of centering the patch under the hole 22 and retaining the patch in position when the casing is being mounted.

The form shown in Fig. 12 is identical with that shown in Fig. 2, with the exception that the top layer 11 has been omitted. The sealing material carrying cavity or pocket still exists and is preformed in the lower layers of fabric 12 and rubber 13. The hole centering pilot 18 has its head centrally embedded in the sealing material so that when the pilot is pushed through the casing hole, the material 16 is centered about the inner orifice of the hole, and the outer portion of the patch fits up snugly by an appreciable area into intimate contact with the inner side of the casing wall. In this Fig. 12 form, the sealing material is confined centrally of the casing hole entirely by this contact of the outer patch portion with the casing.

While, of course, it is feasible to manufacture the patches in any of the above described forms to carry initially the tire dough or hole sealing material 16 and also to have a coating of raw rubber over the casing side of the patch to cement or vulcanize the patch to the casing, all to be covered by Holland cloth or the like, it is highly desirable to apply the sealing and cementing or vulcanizing materials freshly to each individual patch at the time of making the repair.

While the invention has herein been shown in its preferred form with several modified forms, it is obvious that structural variations may be employed without departing from the spirit of the invention and I, therefore, do not desire to be limited to those precise forms beyond the limitations as may be imposed by the following claims.

I claim:

1. A device for patching holes in tire covers or casings comprising a flexible repair patch adapted to contact an appreciable area of the tire cover or casing having a reservoir with a discharge into the hole in the tire cover, and a quantity of initially-flowable tire-hole sealing material contained in said reservoir, the area of the patch being sufficient to prevent the escape of the sealing material between the patch and casing around the reservoir discharge.

2. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch.

3. A tire repair patch flexible in nature having an outer peripheral zone adapted to contact initially an appreciable area of the tire, and having a central zone to receive and carry a quantity of tire hole sealing, initially flowable materials, and a pilot extending from said zone, said central zone comprising a pocket formed in the patch, said pilot extending into said pocket and detachably retained therein by one end in intimate contact with said material.

4. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch, a cover over said pocket having an orifice therein from which said pilot extends.

5. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch, a cover over said pocket having an orifice therein from which said pilot extends, said pilot being wick-like in nature and serving to feed said material therealong from said pocket.

6. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch, a cover over said pocket having an orifice therein from which said pilot extends, said pilot extending into said pocket and having a head therein detachably retaining the pilot in position.

7. A tire repair patch flexible in nature having an outer peripheral zone adapted to contact initially an appreciable area of the tire, and having a central zone to receive and carry a quantity of tire hole sealing, initially flowable material, and a pilot extending from said zone, and a plurality of spaced apart ribs projecting from the tire contacting side of said peripheral zone, said ribs being formed to be embedible in the wall of said tire and serving to prevent lateral flow of said material between the patch and tire when the patch is subjected to pressure from behind, whereby the flow of said material will be outwardly through a tire hole being covered by the patch.

8. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch, a cover over said pocket having an orifice therein from which said pilot extends, and a plurality of spaced apart ribs projecting from the tire contacting side of said peripheral zone, said ribs being formed to be embedible in the wall of said tire and serving to prevent lateral flow of said material between the patch and tire when the patch is subjected to pressure from behind, whereby the flow of said material will be outwardly through a tire hole being covered by the patch.

9. A tire casing repair patch having a plurality of spaced apart ribs projecting therefrom on its casing contacting side, said ribs being of gradually decreased elevation from the center outwardly of the patch with outer terminal knife-like edges and with sufficient base formed to cause the ribs to bite into and become embedded in the casing wall to form a seal therewith and to prevent after slippage of the patch therealong.

10. A tire repair patch flexible in nature having an outer peripheral zone adapted to contact initially an appreciable area of the tire, and having a central zone to receive and carry a quantity of tire hole sealing, initially flowable material, and a pilot extending from said zone, said central zone comprising a pocket formed in the patch, a cover over said pocket having an orifice therein from which said pilot extends, and a boss projecting from said cover carrying said orifice, said boss tending to enter as a nozzle into a hole in the tire being repaired.

11. A tire repair patch comprising an upper layer and a lower layer of flexible material, the two layers being joined one to the other around their peripheral areas leaving a potential pocket therebetween, said upper layer having a passageway communicating with said pocket, and a quantity of tire repair sealing material carried by the pocket and ejected therefrom by compression on the patch, and a pilot extending through said passageway, and a head on said pilot abutting the inner side of said outer layer whereby said pilot is detachably secured to the patch and forms an initial closure to said passageway.

THOMAS W. MULLEN.